(12) United States Patent
Masuda et al.

(10) Patent No.: US 11,479,718 B2
(45) Date of Patent: Oct. 25, 2022

(54) PRODUCTION METHOD OF METHYLAMMONIUM LEAD HALIDE PEROVSKITE QUANTUM DOTS

(71) Applicants: TOYOTA JIDOSHA KABUSHIKI KAISHA, Toyota (JP); The University of Electro-Communications, Chofu (JP)

(72) Inventors: Taizo Masuda, Yokohama (JP); Qing Shen, Chofu (JP); Chao Ding, Chofu (JP); Yaohong Zhang, Chofu (JP); Feng Liu, Chofu (JP)

(73) Assignees: TOYOTA JIDOSHA KABUSHIKI KAISHA, Toyota (JP); THE UNIVERSITY OF ELECTRO-COMMUNICATIONS, Chofu (JP)

( * ) Notice: Subject to any disclaimer, the term of this patent is extended or adjusted under 35 U.S.C. 154(b) by 65 days.

(21) Appl. No.: 17/218,681

(22) Filed: Mar. 31, 2021

(65) Prior Publication Data
US 2021/0317366 A1 Oct. 14, 2021

(30) Foreign Application Priority Data
Apr. 8, 2020 (JP) .............................. JP2020-069816

(51) Int. Cl.
*C09K 11/66* (2006.01)
*C07F 7/24* (2006.01)
*B82Y 40/00* (2011.01)
*B82Y 20/00* (2011.01)

(52) U.S. Cl.
CPC .............. *C09K 11/664* (2013.01); *C07F 7/24* (2013.01); *B82Y 20/00* (2013.01); *B82Y 40/00* (2013.01)

(58) Field of Classification Search
CPC ................................ C09K 11/664; C07F 7/24
See application file for complete search history.

(56) References Cited

U.S. PATENT DOCUMENTS 11,208,592 B2 * 12/2021 Masuda .................... C07F 7/24

OTHER PUBLICATIONS

Imran, et al. BenzoylHalidesasAlternativePrecursorsfortheColloidalSynthesisofLead-BasedHalide PerovskiteNanocrystals, J.Am. Chem. Soc, 2018, 140, 2656-2664.

* cited by examiner

*Primary Examiner* — C Melissa Koslow
(74) *Attorney, Agent, or Firm* — Sughrue Mion, PLLC

(57) ABSTRACT

A method of the present disclosure for producing methylammonium lead halide perovskite quantum dots includes providing a Pb-oleic acid solution containing a Pb source that is soluble in oleic acid, oleic acid, and a non-polar solvent, providing a methylammonium-oleic acid solution containing methylammonium acetate and oleic acid, providing a reaction solution of tetrabutylammonium halide and oleylamine, and mixing the Pb-oleic acid solution, the methylammonium-oleic acid solution, and the reaction solution.

9 Claims, 4 Drawing Sheets

PRODUCTION METHOD OF METHYLAMMONIUM LEAD HALIDE PEROVSKITE QUANTUM DOTS

CROSS-REFERENCE TO RELATED APPLICATION

This application claims priority to Japanese Patent Application No. 2020-069816 filed on Apr. 8, 2020, incorporated herein by reference in its entirety.

BACKGROUND

1. Technical Field

The present disclosure relates to a production method of methylammonium lead halide perovskite quantum dots.

2. Description of Related Art

Perovskite quantum dots are beginning to attract attention as a new fluorescent material because perovskite quantum dots have high luminous efficiency and are adjustable emission wavelength over a wide range.

Imran, et al. Benzoyl Halides as Alternative Precursors for the Colloidal Synthesis of Lead-Based Halide Perovskite Nanocrystals, J. Am. Chem. Soc, 2018, 140, 2656-2664 (referred to as a related art) discloses a production method of methylammonium lead halide quantum dots, which are one of perovskite quantum dots.

Specifically, the related art describes that the methylammonium lead halide perovskite quantum dots can be produced by adding dropwise a methylamine solution (tetrahydrofuran in which methylamine is dissolved) to a lead oxide solution (lead oxide powder/oleic acid/oleylamine/octadecane mixed solution), and then injecting a benzoyl halide solution as a halogen source (benzoyl halide/oleic acid/oleylamine), by a hot injection method.

SUMMARY

The methylammonium lead halide perovskite quantum dots produced by the production method disclosed in the related art have luminous efficiency of 92% when halogen is Br, 45% when halogen is I, and 5% when halogen is Cl. In addition, the methylammonium lead halide perovskite quantum dots produced by the production method disclosed in the same document emit light for several days after production.

However, there is a demand for producing methylammonium lead halide perovskite quantum dots having higher luminous efficiency and higher durability.

The present disclosure provides a production method of methylammonium lead halide perovskite quantum dots having high luminous efficiency and high durability.

The above tasks can be achieved by the following means:

An aspect of the present disclosure relates to a production method of methylammonium lead halide perovskite quantum dots. The production method includes providing a Pb-oleic acid solution containing a Pb source that is soluble in oleic acid, oleic acid, and a non-polar solvent, providing a methylammonium-oleic acid solution containing methylammonium acetate and oleic acid, providing a reaction solution of tetrabutylammonium halide and oleylamine, and mixing the Pb-oleic acid solution, the methylammonium-oleic acid solution, and the reaction solution.

In the aspect, the Pb source in the Pb-oleic acid solution may be lead acetate or lead oxide.

In the aspect, the reaction solution may be obtained by mixing tetrabutylammonium halide and oleylamine and heating the mixture at 180° C. to 190° C.

In the aspect, when the Pb-oleic acid solution, the methylammonium-oleic acid solution, and the reaction solution are mixed, one of the methylammonium-oleic acid solution and the reaction solution may be mixed with the Pb-oleic acid solution, and then the other one may be mixed.

In the aspect, a temperature of the reaction solution when the reaction solution is mixed with the Pb-oleic acid solution may be 70° C. to 130° C.

In the aspect, halogen of the tetrabutylammonium halide may be Cl, and a temperature of the reaction solution when the reaction solution is mixed with the Pb-oleic acid solution may be 70° C. to 100° C.

In the aspect, halogen of the tetrabutylammonium halide may be Br, and a temperature of the reaction solution when the reaction solution is mixed with the Pb-oleic acid solution may be 115° C. to 130° C.

In the aspect, halogen of the tetrabutylammonium halide may be I, and a temperature of the reaction solution when the reaction solution is mixed with the Pb-oleic acid solution may be 90° C. to 110° C.

In the aspect, the Pb-oleic acid solution, the methylammonium-oleic acid solution, and the reaction solution may be mixed using a hot injection method.

According to the present disclosure, a production method of methylammonium lead halide perovskite quantum dots having high luminous efficiency and high durability can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
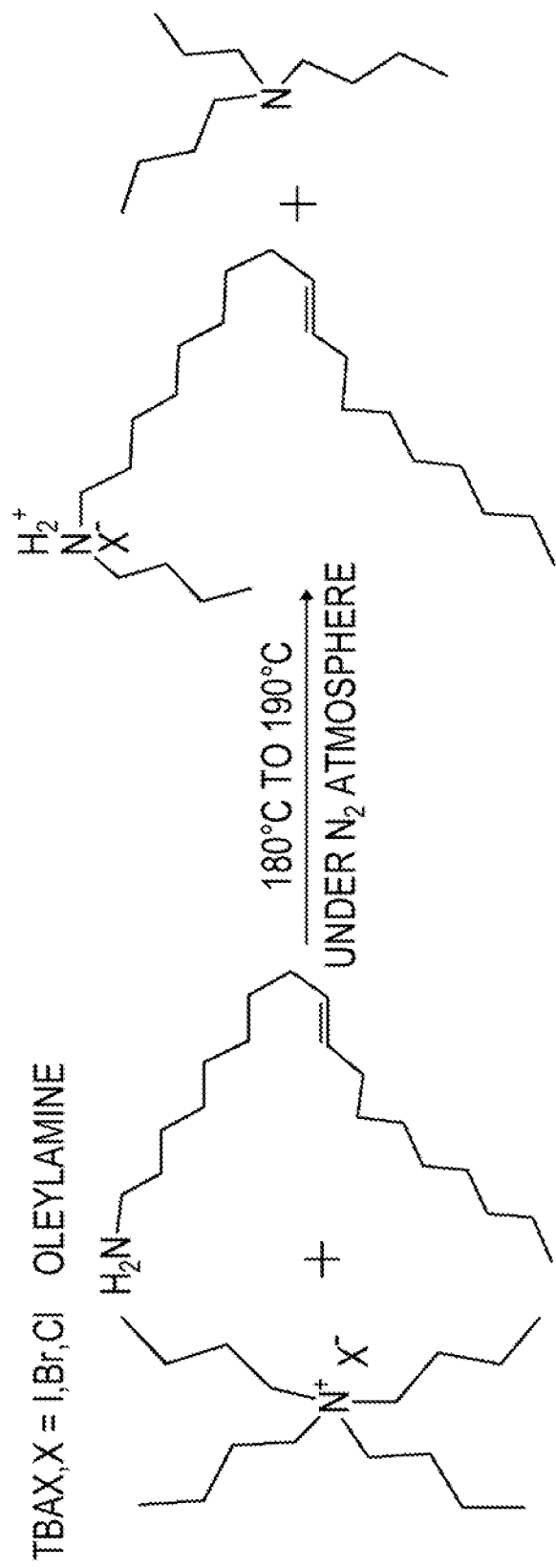
FIG. 1 is a view showing a reaction formula between tetrabutylammonium halide and oleylamine.

Hereinafter, an embodiment of the present disclosure will be described in detail. It should be noted that the present disclosure is not limited to the following embodiment, and can be implemented with various modifications within the scope of the purpose of the present disclosure.

In the present disclosure, the term "quantum dot" refers to a methylammonium lead halide perovskite quantum dot unless otherwise specified.

A method of the present disclosure for producing methylammonium lead halide perovskite quantum dots includes (A) providing a Pb-oleic acid solution containing a Pb source that is soluble in oleic acid, oleic acid, and a non-polar solvent, (B) providing a methylammonium-oleic acid solution containing methylammonium acetate and oleic acid, (C) providing a reaction solution of tetrabutylammonium halide and oleylamine, and (D) mixing the Pb-oleic acid solution, the methylammonium-oleic acid solution, and the reaction solution.

Although not limited by a principle, the principle that methylammonium lead halide perovskite quantum dots having high luminous efficiency and high durability can be produced by the method of the present disclosure is as follows.

In general, quantum dots absorb light having a wavelength shorter than a wavelength emitted by the quantum dots and re-emit. A ratio of the number of emitted photons to the number of absorbed photons is the luminous efficiency.

Part of light energy absorbed by the quantum dots may cause non-emission recombination of carriers in the quantum dots and be lost as thermal energy or the like, and this loss is one of reasons that the luminous efficiency of the quantum dots is reduced. This loss can be reduced by reducing the defects and distortions of the quantum dots and by sufficiently introducing ligands, such as oleic acid and oleylamine into the quantum dots.

Further, depending on the production method, a quantum dot solution may become transparent and no longer absorb or emit light several days after the production, that is, the quantum dot solution may have low durability. The reason for this is that the quantum dots aggregate and precipitate in the solution. Therefore, the durability of the quantum dots can be improved by suppressing the aggregation of the quantum dots.

In this regard, in the production method disclosed in the related art, highly volatile methylamine is used and a formation of quantum dots is needed to be performed at a low temperature of, for example, around 65° C., so that there are many defects and distortions in the obtained quantum dots and ligands, such as oleic acid and oleylamine cannot be sufficiently introduced into the quantum dots. In addition, in the production method disclosed in the related art, tetrahydrofuran, which is a polar solvent, is used as a solvent to dissolve methylamine. Therefore, at the time of forming the quantum dots, the quantum dots are aggregated and/or the ligand is detached. The characteristics of the aggregated quantum dots are affected by the characteristics of quantum dots having the worst characteristics.

Due to the above reasons, it is difficult to improve the luminous efficiency of the quantum dots with the method disclosed in the related art.

In addition, in the method disclosed in the related art, tetrahydrofuran, which is a polar solvent, is used, so that the produced quantum dots tend to aggregate. Note that, tetrahydrofuran, which is a polar solvent, is difficult to remove completely even though the produced quantum dots are cleaned. In addition, performing the cleaning multiple times causes an increase in production cost of the quantum dots.

Therefore, it is difficult to improve the durability of the quantum dots with the method disclosed in the related art.

In contrast, in the production method of the present disclosure, a Pb-oleic acid solution containing a Pb source that is soluble in oleic acid, oleic acid, and a non-polar solvent, a methylammonium-oleic acid solution containing methylammonium acetate and oleic acid, and a reaction solution of tetrabutylammonium halide and oleylamine are used. All of these solutions are stable even when heated to 100° C. or higher, contain a molecule serving as a ligand, and do not contain a polar solvent.

Therefore, when quantum dots are formed by mixing these solutions, preparation can be performed at a sufficiently high temperature, and the ligands can be sufficiently introduced into the quantum dots. Moreover, since none of these solutions contains a polar solvent, the aggregation of the quantum dots can be suppressed.

Therefore, the quantum dots produced by the production method of the present disclosure have high luminous efficiency and high durability. Further, since the quantum dots produced by the production method of the present disclosure are formed by using a non-polar solvent and the aggregation is less likely to occur even with a small number of cleanings, it is possible to reduce costs by simplifying the production process.

Process A

Process A is a process of providing the Pb-oleic acid solution containing a Pb source that is soluble in oleic acid, oleic acid, and a non-polar solvent. The Pb-oleic acid solution may be provided by using a pre-prepared one or by preparing when the production method of the present disclosure is carried out.

For example, the Pb-oleic acid solution can be prepared by mixing a Pb source, oleic acid, and a non-polar solvent. For example, the Pb-oleic acid solution may be prepared under a nitrogen atmosphere.

A mixing ratio of a Pb source, oleic acid, and a non-polar solvent in preparing the Pb-oleic acid solution is not particularly limited, as long as a Pb source and oleic acid can be dissolved in a non-polar solvent. For example, oleic acid may be 6.0 ml or more and a non-polar solvent may be 20 ml or more with respect to 1.0 mol of a Pb source.

In the preparation of the Pb-oleic acid solution, after a Pb source, oleic acid, and a non-polar solvent are mixed, a degassing treatment may be performed by heating the mixture to remove impurities. The degassing treatment may be performed at, for example, 100° C. to 150° C. for one minute to 60 minutes. The heating temperature may be 120° C. or higher.

A temperature condition of the degassing treatment may be 100° C. or higher, 110° C. or higher, or 120° C. or higher, and may be 150° C. or lower, 140° C. or lower, or 130° C. or lower. A degassing treatment time may be one minute or more, 10 minutes or more, or 20 minutes or more, and may be 60 minutes or less, 40 minutes or less, or 30 minutes or less.

Pb Source

The Pb source may be any compound that contains Pb as a component and is soluble in oleic acid. Examples of such a compound include lead oxide and lead acetate. Lead acetate may be trihydrate.

Non-Polar Solvent

The non-polar solvent may be any non-polar solvent that can dissolve the Pb source and oleic acid. Further, in the production method of the present disclosure, the non-polar solvent may be any non-polar solvent that has a boiling point higher than a temperature condition needed for a process using a non-polar solvent, and can stably dissolve or disperse the solute or dispersoid. Examples of such a non-polar solvent include 1-octadecane.

Process B

Process B is a process of providing a methylammonium-oleic acid solution containing methylammonium acetate and oleic acid. The methylammonium-oleic acid solution may be provided by using a pre-prepared one or by preparing when the production method of the present disclosure is carried out.

The methylammonium-oleic acid solution can further contain a non-polar solvent. The non-polar solvent may be any non-polar solvent that can dissolve methylammonium acetate and oleic acid. Further, in the production method of the present disclosure, the non-polar solvent may be any non-polar solvent that has a boiling point higher than a temperature condition needed for a process using a non-polar solvent, and can stably dissolve or disperse the solute or dispersoid. Examples of such a non-polar solvent include 1-octadecane.

The methylammonium-oleic acid solution can be prepared, for example, by mixing and heating methylammonium acetate and oleic acid, and optionally a non-polar solvent. For example, the methylammonium-oleic acid solution may be prepared under a nitrogen atmosphere. Further, a degassing treatment may be performed to remove impurities, before heating. The degassing treatment may be performed at, for example, room temperature for one minute to 60 minutes.

A temperature condition of the degassing treatment may be 0° C. or higher, 10° C. or higher, or 15° C. or higher, and 30° C. or lower, 25° C. or lower, or 20° C. or lower. A degassing treatment time may be one minute or more, 10 minutes or more, or 20 minutes or more, and may be 60 minutes or less, 40 minutes or less, or 30 minutes or less.

In the preparation of the methylammonium-oleic acid solution, a ratio of methylammonium acetate and oleic acid is not particularly limited, but for example, oleic acid may be 6.0 ml or more with respect to 1.0 mol of methylammonium acetate.

In the preparation of the methylammonium-oleic acid solution, a heating temperature may be a temperature at which methylammonium acetate can be completely dissolved, for example, 50° C. to 100° C. The heating temperature may be 70° C. or higher.

The heating temperature may be 50° C. or higher, 60° C. or higher, or 70° C. or higher, and may be 100° C. or lower, 90° C. or lower, or 80° C. or lower.

Process C

Process C is a process of providing a reaction solution of tetrabutylammonium halide and oleylamine. The reaction solution may be provided by using a pre-prepared one or by preparing when the production method of the present disclosure is carried out.

The reaction solution can contain a non-polar solvent. The non-polar solvent may be any non-polar solvent that can dissolve tetrabutylammonium halide and oleylamine. Further, in the production method of the present disclosure, the non-polar solvent may be any non-polar solvent that has a boiling point higher than a temperature condition needed for a process using a non-polar solvent, and can stably dissolve or disperse the solute or dispersoid. Examples of such a non-polar solvent include 1-octadecane.

The reaction solution can be prepared, for example, by mixing tetrabutylammonium halide and oleylamine and reacting the tetrabutylammonium halide with oleylamine by heating. The heating temperature may be 180° C. to 190° C.

The heating temperature may be 180° C. or higher, 183° C. or higher, or 185° C. or higher, and may be 190° C. or lower, 187° C. or lower, or 185° C. or lower.

Further, the reaction between tetrabutylammonium halide and oleylamine may be performed under a nitrogen atmosphere.

Further, a degassing treatment for removing impurities may be performed before performing the reaction between tetrabutylammonium halide and oleylamine. The degassing treatment may be performed at, for example, 100° C. to 150° C. for one minute to 60 minutes.

A temperature condition of the degassing treatment may be 100° C. or higher, 110° C. or higher, or 120° C. or higher, and may be 150° C. or lower, 140° C. or lower, or 130° C. or lower. A degassing treatment time may be one minute or more, 10 minutes or more, or 20 minutes or more, and may be 60 minutes or less, 40 minutes or less, or 30 minutes or less.

The reaction between tetrabutylammonium halide and oleylamine may be, for example, a reaction represented by a reaction formula shown in FIG. 1.

Tetrabutylammonium Halide

Halogen of tetrabutylammonium halide may be Cl, Br, or I, or a combination thereof An emission spectrum of the prepared quantum dots can be adjusted as desired by changing a ratio of Cl, Br, and I.

Process D

Process D is a process of mixing the Pb-oleic acid solution, the methylammonium-oleic acid solution, and the reaction solution.

Process D is performed, for example, by mixing one of the methylammonium-oleic acid solution and the reaction solution with the Pb-oleic acid solution, and then mixing the other one. In addition, Process D may be performed by mixing the methylammonium-oleic acid solution and the reaction solution first, and then mixing these with the Pb-oleic acid solution. Further, these mixing may be performed under a nitrogen atmosphere.

A mixing ratio of the Pb-oleic acid solution, the methylammonium-oleic acid solution, and the reaction solution is not particularly limited.

A temperature when the methylammonium-oleic acid solution is mixed with the Pb-oleic acid solution may be 70° C. to 150° C.

The temperature when the methylammonium-oleic acid solution is mixed with the Pb-oleic acid solution may be 70° C. or higher, 90° C. or higher, or 100° C. or higher, and may be 150° C. or lower, 130° C. or lower, or 120° C. or lower.

A temperature of the reaction solution when the reaction solution is mixed with the Pb-oleic acid solution may be 70° C. to 130° C.

The temperature of the reaction solution when the reaction solution is mixed with the Pb-oleic acid solution may be 70° C. or higher, 90° C. or higher, or 100° C. or higher, and may be 130° C. or lower, 120° C. or lower, or 110° C. or lower.

Here, when halogen of the tetrabutylammonium halide is Cl, the temperature of the reaction solution when the reaction solution is mixed with the Pb-oleic acid solution may be 70° C. to 100° C. In addition, when halogen of the tetrabutylammonium halide is Br, the temperature of the reaction solution when the reaction solution is mixed with the Pb-oleic acid solution may be 115° C. to 130° C. Further, when halogen of the tetrabutylammonium halide is I, the temperature of the reaction solution when the reaction solution is mixed with the Pb-oleic acid solution may be 90° C. to 110° C.

In Process D, when the Pb-oleic acid solution, the methylammonium-oleic acid solution, and the reaction solution are all mixed, the methylammonium lead halide perovskite quantum dots are formed. The quantum dot forming reaction can be stopped by cooling the mixed solution of the Pb-oleic acid solution, the methylammonium-oleic acid solution, and the reaction solution to room temperature or lower.

The quantum dot forming reaction may be performed for five to 60 seconds and then stopped. The quantum dot forming reaction may be performed for five seconds or more, 10 seconds or more, or 15 seconds or more, and for 60 seconds or less, 45 seconds or less, or 30 seconds or less.

Process D can be performed by using a hot injection method, for example. More specifically, Process D may be performed by a method of injecting the methylammonium-oleic acid solution and the reaction solution into the heated Pb-oleic acid solution.

Other Processes

The production method of the present disclosure may further include, after Process D, a process of centrifuging the obtained mixed solution to obtain a precipitate (Process E) and a process of dispersing the obtained precipitate in a non-polar solvent (Process F).

Process E

Process E is a process of centrifuging the mixed solution obtained in Process D to obtain a precipitate.

Unreacted substances, impurities, or the like can be separated from the quantum dots by performing Process E, so that the luminous efficiency and durability of a quantum dot solution can be further improved.

In Process E, centrifugation may be performed by adding methyl acetate to the mixed solution obtained in Process D or without adding methyl acetate. Further, in Process E, centrifugation may be performed by once centrifuging the mixed solution obtained in Process D, dispersing the obtained precipitate in a mixed solution of a non-polar solvent and methyl acetate, and further performing centrifugation.

The non-polar solvent in this Process may be any non-polar solvent that can stably dispersing the quantum dots formed in Process D in a colloidal state. Examples of such a non-polar solvent include toluene.

Process F

Process F is a process of dispersing the precipitate obtained in Process E, that is, the quantum dots in a non-polar solvent. The non-polar solvent in this Process may be any non-polar solvent that can stably dispersing the quantum dots in a colloidal state. Examples of such a non-polar solvent include octane.

Examples 1 to 3

Quantum dot solutions of Examples 1 to 3 were prepared as follows, and a performance of each quantum dot solution was evaluated.

Example 1

Preparation of Pb-Oleic Acid Solution

In a 50 ml flask, 0.74 mmol (0.281 g) of lead acetate trihydrate, 6 ml of oleic acid, and 20 ml of 1-octadecane were placed and mixed until the lead acetate trihydrate was completely dissolved. Then, a degassing treatment was performed on the obtained solution at 120° C. for 10 minutes under a nitrogen atmosphere to remove impurities, and the Pb-oleic acid solution was prepared.

Preparation of Methylammonium-Oleic Acid Solution

In a 50 ml flask, 5.00 mmol (0.521 g) of methylammonium acetate and 10 ml of oleic acid were placed and mixed, and then a degassing treatment was performed at room temperature for two minutes to remove impurities. Thereafter, the flask was filled with nitrogen gas to raise the temperature to 70° C., and held until the solution in the flask was completely transparent, that is, the methylammonium acetate was completely dissolved in the oleic acid, and then the temperature was returned to room temperature.

Preparation of Reaction Solution of Tetrabutylammonium Iodide and Oleylamine

In a 50 ml flask, 7.30 mmol of tetrabutylammonium iodide (TBAI) and 10 ml of oleic acid were placed and mixed and a degassing treatment was performed at 120° C. for 10 minutes to remove impurities. Thereafter, the temperature was raised to 180° C. under a nitrogen atmosphere and held until the solution in the flask was completely transparent, that is, the tetrabutylammonium iodide and the oleylamine were completely reacted, and then the temperature was returned to room temperature.

Preparation of Quantum Dot Solution

The quantum dot solution of Example 1 was prepared by the hot injection method.

Specifically, first, all the prepared Pb-oleic acid solution was placed in the flask, and 3 ml of the reaction solution of tetrabutylammonium iodide and oleylamine was added under a nitrogen atmosphere while the temperature was raised to 120° C. with a mantle heater and held for 30 minutes.

Thereafter, the temperature of the mixed solution of the Pb-oleic acid solution and the reaction solution of tetrabutylammonium iodide and oleylamine was changed to 150° C., and 6 ml of the methylammonium-oleic acid solution in which the temperature was raised to 60° C. under a nitrogen atmosphere was added. After the reaction was performed for 10 seconds, ice water was placed in the flask to stop the reaction, so that a crude quantum dot solution containing quantum dots was prepared.

When the temperature of the crude quantum dot solution was lowered to room temperature, 1 ml of toluene and 5 ml of methyl acetate were added, and centrifugation was performed at 8000 rpm for 10 minutes.

The obtained precipitate, that is, the quantum dots, was dispersed in 5 ml of octane as a non-polar solvent to prepare the quantum dot solution of Example 1.

Example 2

The quantum dot solution of Example 2 was prepared in the same manner as in Example 1 except that tetrabutylammonium bromide was used instead of tetrabutylammonium iodide.

Example 3

The quantum dot solution of Example 3 was prepared in the same manner as in Example 1 except that tetrabutylammonium chloride was used instead of tetrabutylammonium iodide.

Evaluation of Performance

Evaluation of Luminous Efficiency

Method

Figure 2:
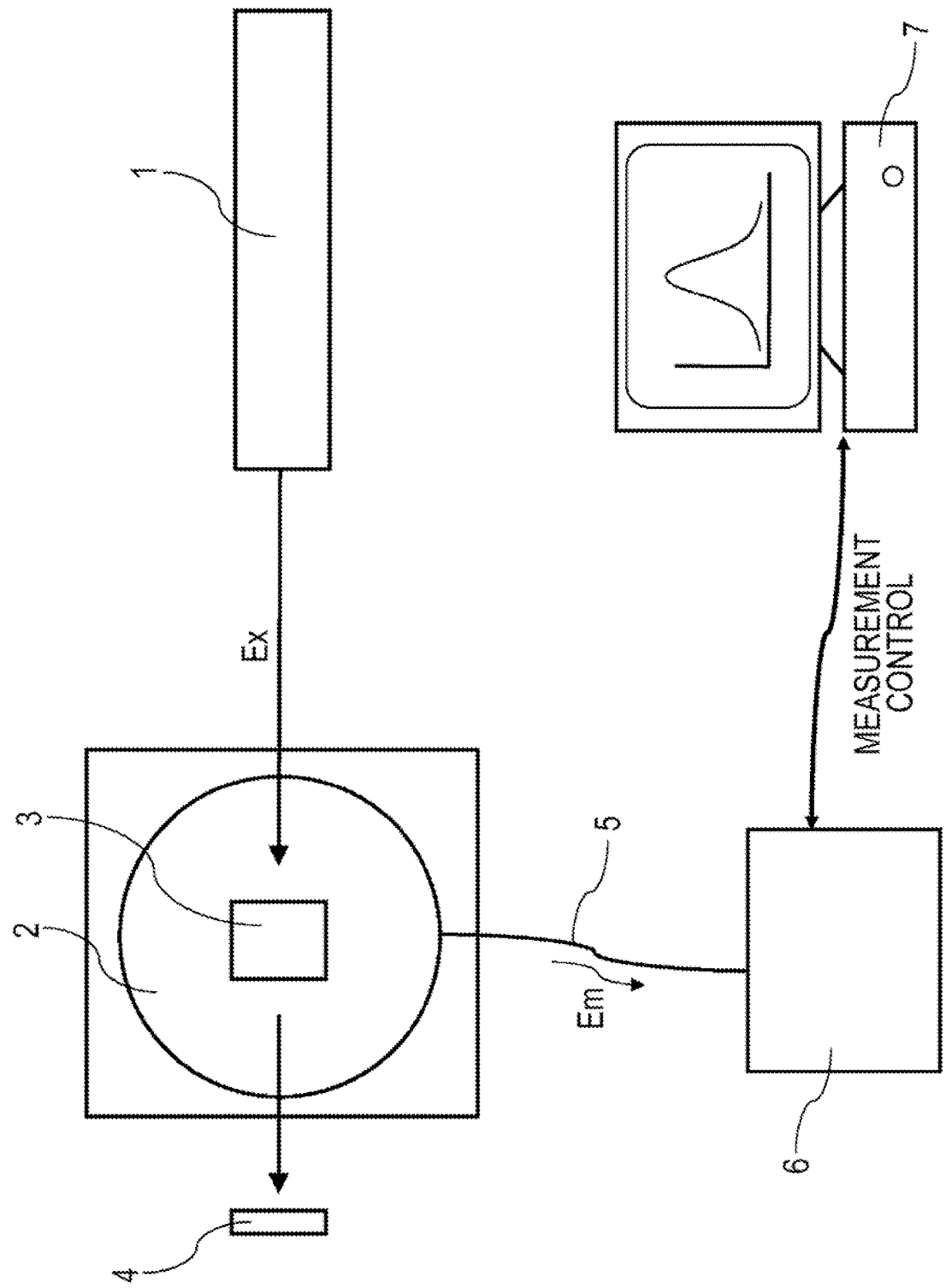
FIG. 2 is a schematic view of an apparatus used for measuring luminous efficiency of a quantum dot solution of each Example produced by a production method of the present disclosure.

Luminous efficiency of the quantum dot solution of each Example immediately after production was measured by the following method. That is, as shown in FIG. 2, a green He—Ne laser (543 nm PMS Electro-Optics LHGR-0050) was used as an excitation light source 1, and the laser was introduced into an integrating sphere 2 (Labsphere, Inc., 3P-GPS-020-SL) such that a sample solution 3 disposed in the integrating sphere 2 is irradiated. Then, while a power of light transmitted through the sample solution 3 was measured by a power meter 4 (Advantest Corporation: Optical Power Meter TQ8210), light emitted from the sample solution 3 and reflected and condensed in the integrating sphere 2 was introduced into a spectrometer 6 (Ocean Optics, Inc: FLAME-S) through an optical fiber 5, and the amount of light was measured as the number of photons per unit time for each wavelength (resolution 0.33 nm). Then, measurement and control processing in the spectrometer 6 was executed by a computer 7. Here, a wavelength of the excitation light of the quantum dot solution of Example 1 was 450 nm, and a wavelength of the excitation light of the quantum dot solutions of Examples 2 and 3 was 350 nm. The quantum dot solution of each Example was measured by being diluted to an optical density of 0.1 or less (at the corresponding excitation wavelength) to minimize reabsorption of fluorophore.

Result

Evaluation results of the quantum dot solution of each example are shown in the following Table 1 and FIGS. 3 to 5. In Table 1, $MAPbI_3$ means methylammonium lead iodide perovskite quantum dots, $MAPbBr_3$ means methylammonium lead bromide perovskite quantum dots, and $MAPbCl_3$ means methylammonium lead chloride perovskite quantum dots.

TABLE 1

| Condition Quantum dots | Peak wavelength of emission spectrum (nm) | Half width of emission spectrum (nm) | Luminous efficiency (%) |
|---|---|---|---|
| Example 1 $MAPbI_3$ | 746.0 | 43 | 100 |
| Example 2 $MAPbBr_3$ | 515.0 | 26 | 100 |
| Example 3 $MAPbCl_3$ | 386.4 | 70 | 20 |

As disclosed in the related art, the solutions of the quantum dots produced by the method disclosed in the related art, that is, methylammonium lead iodide perovskite quantum dots, methylammonium lead bromide perovskite quantum dots, and methylammonium lead chloride perovskite quantum dots have luminous efficiencies of 45%, 92%, and 5%, respectively, in that order.

Figure 3:
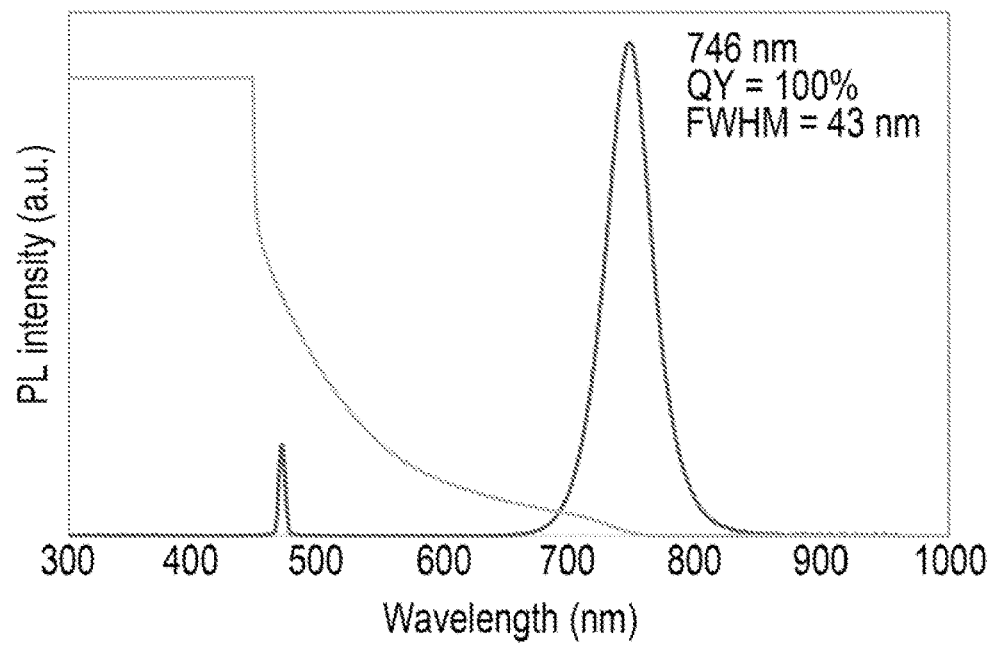
FIG. 3 is a graph showing an emission spectrum of $MAPbI_3$ quantum dots produced by the production method of the present disclosure.
Figure 4:
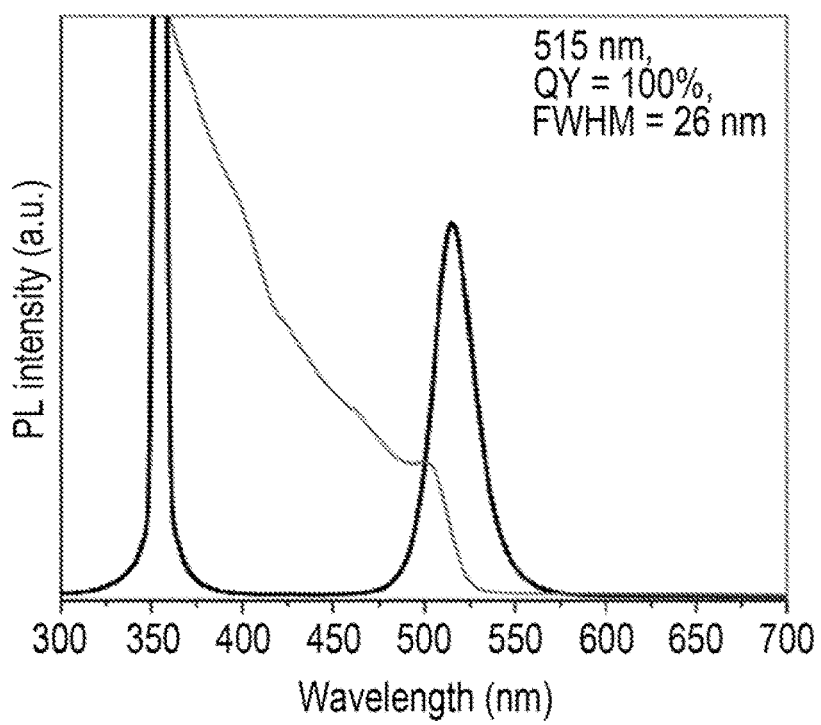
FIG. 4 is a graph showing an emission spectrum of $MAPbBr_3$ quantum dots produced by the production method of the present disclosure.
Figure 5:
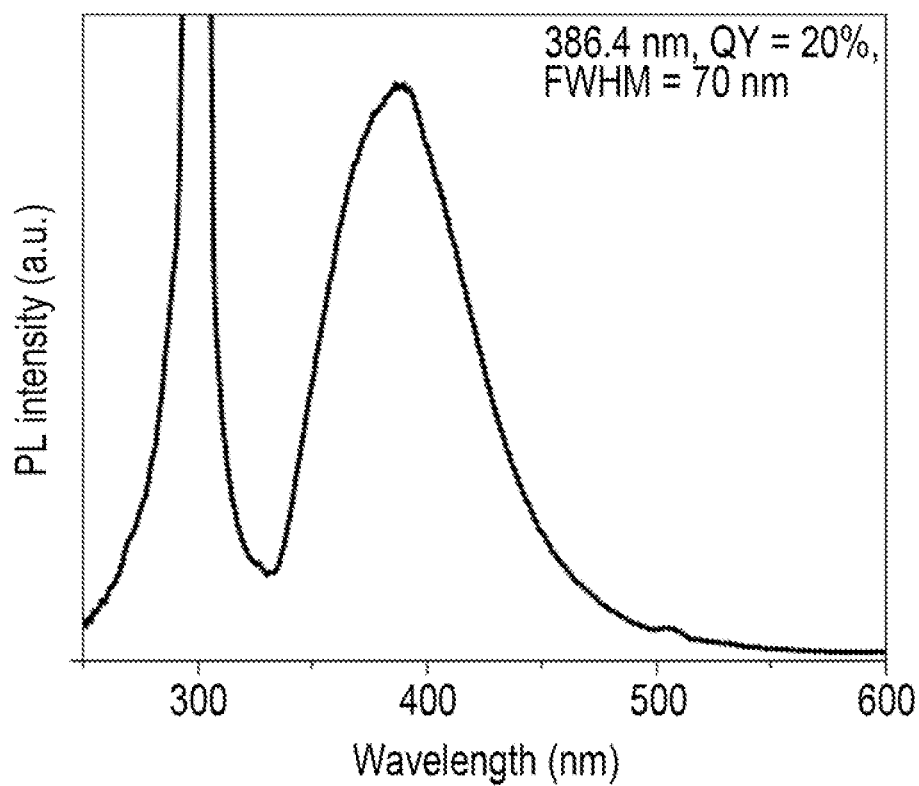
FIG. 5 is a graph showing an emission spectrum of $MAPbCl_3$ quantum dots produced by the production method of the present disclosure.

On the other hand, as shown in Table 1 and FIGS. 3 to 5, the quantum dot solutions of Examples 1 and 2, that is, the solutions of the methylammonium lead iodide perovskite quantum dots and the methylammonium lead bromide perovskite quantum dots have luminous efficiencies of 100%. Further, the quantum dot solution of Example 3, that is, the solution of the methylammonium lead chloride perovskite quantum dots has a luminous efficiency of 20%.

Therefore, the quantum dot solutions of Examples 1 to 3 have improved luminous efficiencies as compared with the quantum dots produced by the method disclosed in the related art.

Evaluation of Durability

Method

After six months from the production, the luminous efficiency of the quantum dot solution of Example 1 was measured by the same method as in the evaluation of the luminous efficiency described above.

Result

The luminous efficiency of the quantum dot solution of Example 1 after six months from the production was 100%, which was not changed from the value measured immediately after the production.

What is claimed is:

1. A production method of methylammonium lead halide perovskite quantum dots, the production method comprising:
   providing a Pb-oleic acid solution containing a Pb source that is soluble in oleic acid, oleic acid, and a non-polar solvent;
   providing a methylammonium-oleic acid solution containing methylammonium acetate and oleic acid;
   providing a reaction solution of tetrabutylammonium halide and oleylamine; and
   mixing the Pb-oleic acid solution, the methylammonium-oleic acid solution, and the reaction solution.

2. The production method according to claim 1, wherein the Pb source in the Pb-oleic acid solution is lead acetate or lead oxide.

3. The production method according to claim 1, wherein the reaction solution is obtained by mixing the tetrabutylammonium halide and the oleylamine and heating a mixture of the tetrabutylammonium halide and the oleylamine at 180° C. to 190° C.

4. The production method according to claim 1, wherein when the Pb-oleic acid solution, the methylammonium-oleic acid solution, and the reaction solution are mixed, one of the methylammonium-oleic acid solution and the reaction solution is mixed with the Pb-oleic acid solution, and then the other one is mixed.

5. The production method according to claim 1, wherein a temperature of the reaction solution when the reaction solution is mixed with the Pb-oleic acid solution is 70° C. to 130° C.

6. The production method according to claim 1, wherein:
   halogen of the tetrabutylammonium halide is Cl; and
   a temperature of the reaction solution when the reaction solution is mixed with the Pb-oleic acid solution is 70° C. to 100° C.

7. The production method according to claim 1, wherein:
   halogen of the tetrabutylammonium halide is Br; and
   a temperature of the reaction solution when the reaction solution is mixed with the Pb-oleic acid solution is 115° C. to 130° C.

8. The production method according to claim 1, wherein:
   halogen of the tetrabutylammonium halide is I; and
   a temperature of the reaction solution when the reaction solution is mixed with the Pb-oleic acid solution is 90° C. to 110° C.

9. The production method according to claim 1, wherein the Pb-oleic acid solution, the methylammonium-oleic acid solution, and the reaction solution are mixed using a hot injection method.

* * * * *